United States Patent [19]
Lundh et al.

[11] Patent Number: 5,474,628
[45] Date of Patent: Dec. 12, 1995

[54] METHOD OF DISTRIBUTING OBJECTS

[75] Inventors: Karl-Erik Lundh, Gislaved; Jan Håkansson, Eslöv, both of Sweden

[73] Assignee: Tetra Laval Holdings & Finance S.A., Pully, Switzerland

[21] Appl. No.: 334,321

[22] Filed: Nov. 2, 1994

[30] Foreign Application Priority Data

Nov. 2, 1993 [SE] Sweden .................................. 9303606

[51] Int. Cl.⁶ .................................................. B32B 31/16
[52] U.S. Cl. ......................... 156/73.1; 156/201; 156/217; 156/227; 156/244.15; 156/544; 264/177.17; 264/442
[58] Field of Search ............................. 156/73.1, 244.11, 156/244.13, 244.15, 293, 201, 202, 217, 226, 227, 544; 264/176.1, 177.12, 23

[56] References Cited

U.S. PATENT DOCUMENTS 4,465,541  8/1984  Charpentier et al. ................ 156/304.1
4,547,236  10/1985  McCartney, Jr. .......................... 156/69

FOREIGN PATENT DOCUMENTS 0082220  6/1983  European Pat. Off. .
896773  10/1959  United Kingdom .

*Primary Examiner*—David A. Simmons
*Assistant Examiner*—J. Sells
*Attorney, Agent, or Firm*—Burns, Doane, Swecker & Mathis

[57] ABSTRACT

The invention relates to a method of distributing opening devices and preparing the opening devices for application individually to a packaging containers. The opening devices are positioned, closed and marshalled together to form a web or a sheet. The prefabricated opening devices are arranged in rows of length x. Two or more of the opening devices in each row are provided with projections which are placed against corresponding opening devices in a neighboring row and are welded together using ultrasonic means.

10 Claims, 2 Drawing Sheets

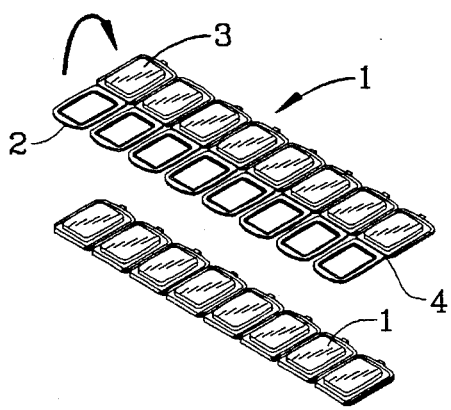
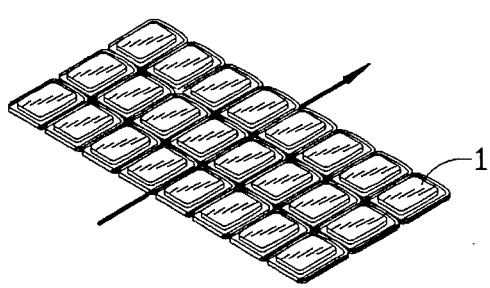
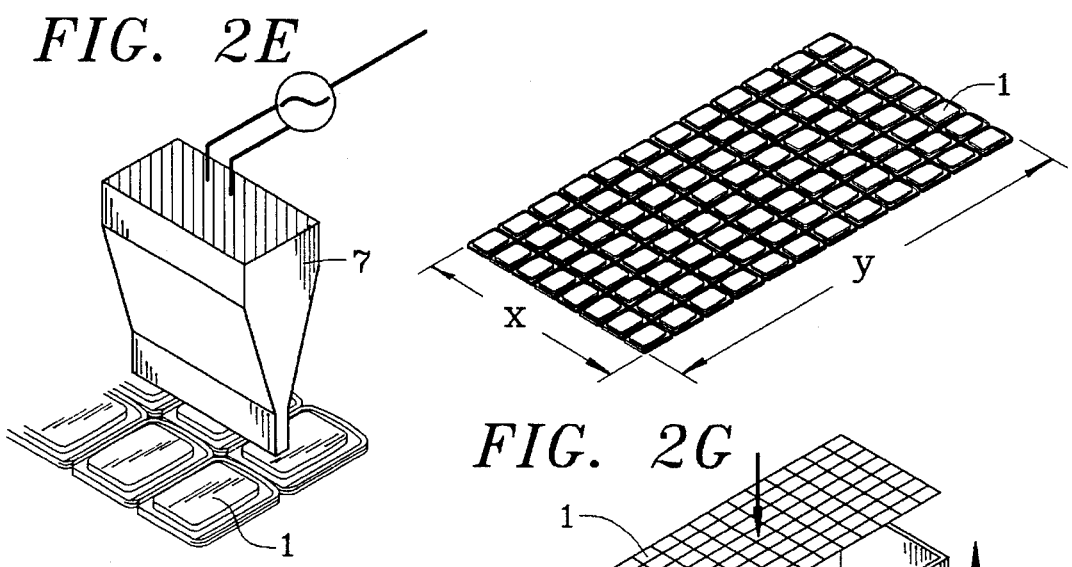
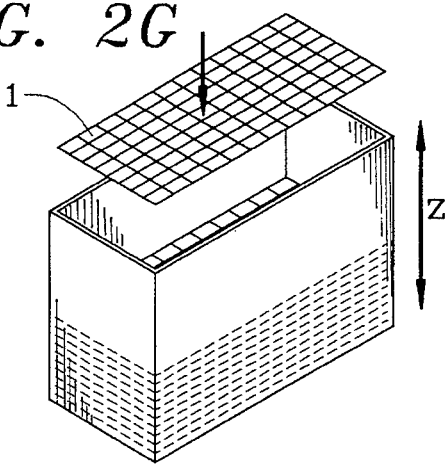
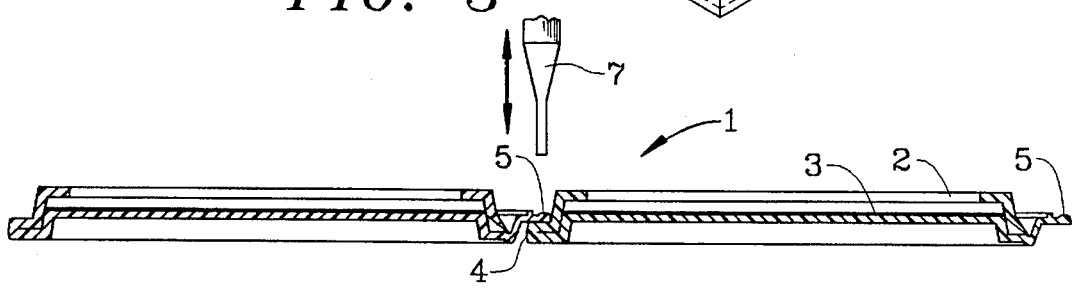

METHOD OF DISTRIBUTING OBJECTS

FIELD OF THE INVENTION

The present invention relates to opening devices for packaging containers and more particularly to a method for distributing and preparing opening devices for application on packaging containers.

BACKGROUND OF THE PRIOR ART

Within the packaging industry, relating in particular to packages for liquid foods such as milk and juice, it is a normal occurrence that an opening device is applied on the outside of the packaging container in order to facilitate the consumer's access to the enclosed content. These opening devices are applied to the outside of the package in an applicator. This applicator most generally operates in such a manner that the opening devices must be oriented in a given way. In order to facilitate this operation, the opening devices should, in some way, be held together so that they are oriented in the same way. Furthermore, it should not be possible for the opening devices to catch in one another or lie against one another so that they run the risk of becoming deformed. Such an opening device which is applied may, for example, consist of an outer pouring part and a closing part.

OBJECTS AND SUMMARY

One object of the present invention is to devise a method of distributing relatively small parts intended to be applied to packaging containers so that the parts are brought, or marshalled, together into a web or a sheet form, which facilitates handling and permits the applicator to be run at a higher speed.

A further object of the present invention is, by an automatic, continuous process, to unite the individual parts together in a simple and economical manner.

These and other objects have been attained according to the present invention in which opening device the parts are connected in rows and are positioned and closed in that said pouring part is closed by a snap-in closure to the closing part. Either the pouring part or the closing part on two or more of the parts in a row, are provided with a projection and a number of similarly prepared rows are joined into a web or a sheet in that the projections on one row are welded together with the corresponding opening device parts on a neighbouring row.

BRIEF DESCRIPTION OF THE ACCOMPANYING DRAWINGS

One preferred embodiment of the present invention will now be described in greater detail hereinbelow, with particular reference to the accompanying Drawings, in which FIG. 1 is a top view of a row of opening part devices;

FIG. 2C is a perspective view of a step of closing the opening parts;

FIG. 2D is a perspective view of a step of arranging adjacent rows of opening parts;

FIG. 2E is a perspective view of a step of welding the rows of opening parts into sheets;

FIG. 2F is a perspective view of a sheet of opening parts of a size x by y;

FIG. 2G is a perspective view of a step of packaging a plurality of sheets in a box or crate; and FIG. 3 is a side view partly in section, of the opening parts being welded together to form a web or sheet.

DESCRIPTION OF PREFERRED EMBODIMENT

The opening device parts which are intended to be distributed according to the present invention consist of a pouring part 2 and a closing part 3 manufactured in one piece, which is to be applied on the outside of a packaging container. Such a packaging container may be constituted by a parallelepipedic package consisting of a laminate with an outside of a thermoplastic layer. This parallelepipedic package is provided with an aperture which is covered by a so-called pull-tab, and the opening device part 1 is intended to be applied around and over the pull-tab.

Figure 1:
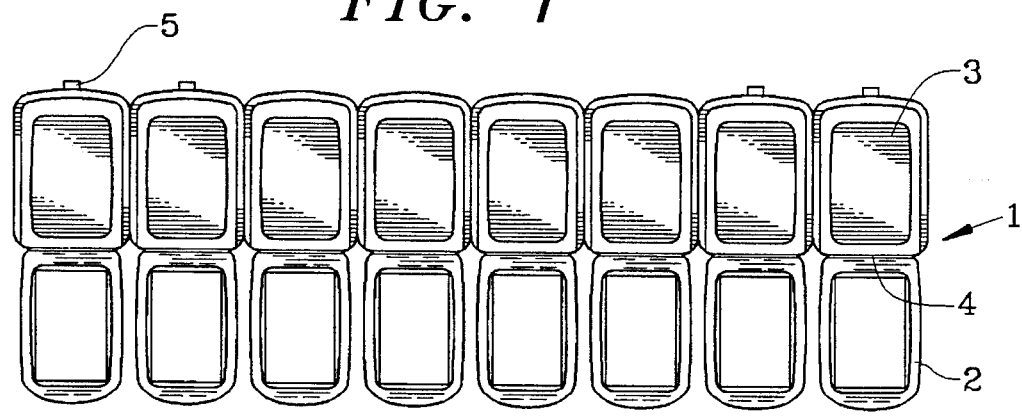

FIG. 1 shows a number of parts 1, as they appear when they have been extruded. The parts 1 are manufactured from plastic material. In this phase, the opening device part 1 is open. The pouring part 2 is intended to be fixed against the outside of the packaging container, and the closing part 3 is passed over the pouring part 2. The pouring part 2 and closing part 3 of an opening device part 1 are united by the intermediary of a hinge piece 4. When the parts 1 are extruded, they are united in a row comprising an X number of opening device parts 1.

On two or more of the closing parts 3 of the opening device part 1, there are small projections 5 projecting outside the edge, these projections are intended to be used for the uniting of a number of rows into a web form. In FIG. 1, and in the preferred embodiment, the two outermost opening device parts 1 on each side are provided with projections 5, this in order to impart greater stability to the web. Alternatively the projections 5 are provided to the pouring part 2 of the opening device part 1.

The parts 1 may be applied on the packaging container in the appearance as shown in FIG. 1, but they may also be closed, in that the closing part 3 is brought together with the pouring part 2 by the whole opening device part 1 being folded over in its hinge piece 4, and closed by means of a snap-in closure.

FIGS. A–G show the process for obtaining a suitable distribution unit for the above described parts 1. When the parts 1 depart from the extruder 6, they arrive in a number of rows of length x. Since the extruder 6 is symmetrically designed and constructed, the rows are mirror-reversed in relation to one another, two-by-two. In order to marshal together the objects 1 to web form, every other row must, therefore, be positioned (FIG. 2B) in that, for example, every other row is lifted by suction cups and rotated through 180°.

Figure 2A:
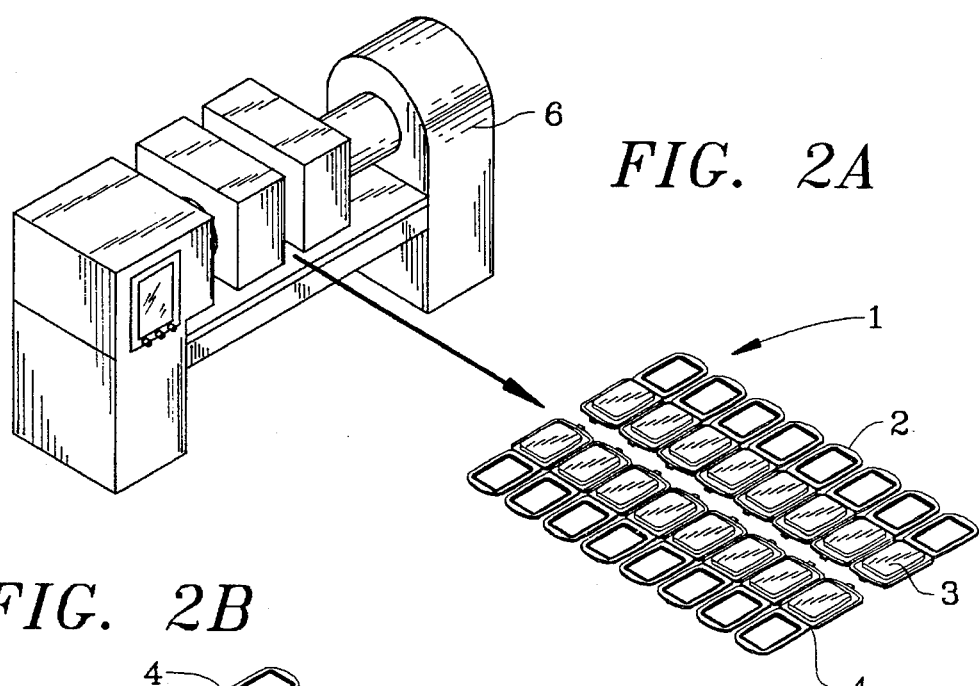
FIG. 2A is a perspective view of a step of extruding opening parts from an extruder.
Figure 2B:
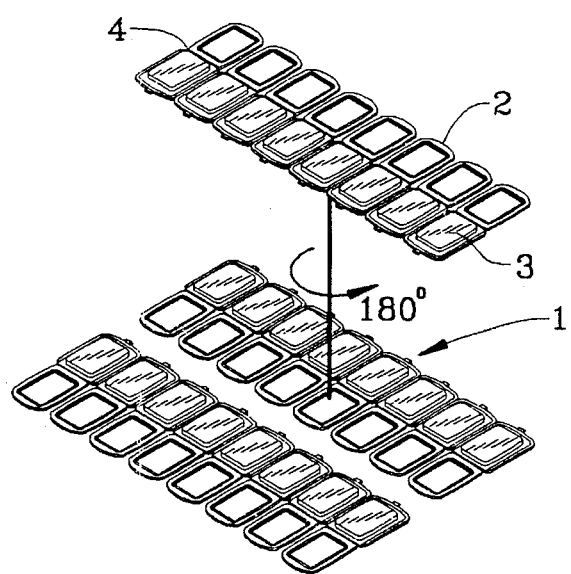
FIG. 2B is a perspective view of a step of reversing every other row of opening parts.

In the preferred embodiment, the parts 1 are intended to be applied in the closed state, for which reason the closing part 3 must be brought together with the pouring part 2, as shown in FIG. 2C. Further, the now closed part 1 are marshalled together in a line in sequence after one another as shown in FIG. 2D.

The rows of parts 1 of length x are retained in a fixture device and are fused or welded together with the subsequent row at the projections 5 with which two or more of the opening device parts 1 are provided.

Given that this process is continuous and automatic, the opening device parts 1 will thus be marshalled together to a web or a sheet form. This may possibly be fed directly to an applicator machine, but since manufacture of the parts 1 most generally does not coincide with application of the objects 1 themselves, it is appropriate to sever the web form into suitable sheets of a size x by x which can be packed in a box or crate to a suitable height z. This is illustrated in FIGS. 2F–G.

FIG. 3 shows the welding operation, which is suitably carried out by means of an ultrasonic horn 7 since, by such means, a directed welding will be obtained of the small surfaces which are contemplated here. Another method of bringing together the projections 5 with the immediately subsequent row can be by heating the projections 5 on one row and the opening device parts 1 on the subsequent row to the melting temperature. The projections 5 are placed so that they rest against the hinge piece 4 on the subsequent row and should be suitably small that they do not obstruct the function of the opening device part 1, nor do they affect its appearance. At the same time, they constitute such slight material quantity that the cost increase will be negligible.

As illustrated in FIG. 3, the projections 5 have a minor indication of fracture 6 where they are secured to the hinge piece 4 of an adjacent opening device part 1. When the web or sheet parts 1 are fed into the applicator, the parts 1 are severed from one another partly on the x-axis and partly on the y-axis into individual parts 1 which are taken charge of by the applicator and secured to the outside of the package using a hot-melt process, or alternatively by heating of the opening device part 1 or the outer thermoplastic layer of the package, respectively.

As will have been apparent from the foregoing description, the present invention realises a method of distributing separate parts intended to be applied on a packaging container so that the parts are easy to handle and cannot be deformed in the event of unsuitable storage. The method also makes it possible for the applicator to operate with continuous and even advancement of the parts which are correctly oriented, and, as a result the applicator may be run at higher speed.

The present invention should not be considered as restricted to that described above and shown on the Drawings, many modifications being conceivable without departing from the spirit and scope of the appended claims.

What is claimed is:

1. A method of distributing and preparing opening devices to be applied to packaging containers comprising:

extruding opening devices which are in an open position and connected to one another to form rows of opening devices, each of said opening devices comprising a pouring part and a closure part;

closing said opening devices so that said closure parts are in a closed position over said pouring parts;

positioning at least two rows of said opening devices adjacent one another; and joining at least some of the opening devices in said at least two rows to form a web of opening devices.

2. The method of claim 1, wherein said step of extruding opening devices includes extruding opening devices wherein at least two of the opening devices in one row include a projection, and said joining step includes joining the projections on the opening devices in said one row to the opening devices in a neighboring row.

3. The method of claim 1, wherein said extruding step includes extruding opening devices wherein two outermost opening devices at each end of at least one row of opening devices are provided with projections and said joining step includes joining the projections on the two outermost opening devices at each end of the at least one row of opening devices to the opening devices in a neighboring row.

4. The method of claim 2, wherein said step of joining is performed by welding.

5. The method of claim 2, wherein said extruding step includes extruding opening devices having projections which are formed with an indication of fracture for separating the opening devices from opening devices in neighboring rows.

6. The method of claim 1, wherein said closing step includes closing the pouring parts by a snap-in closure on the closing part.

7. The method of claim 1, wherein said joining is performed by ultrasonic welding.

8. A method of distributing and preparing opening devices to be applied to packaging containers comprising:

extruding at least two rows of opening devices with each row having an orientation, each of said rows comprising a plurality of opening devices connected together, said opening devices each including a pouring part and a closure part connected to the pouring part by a connecting means;

reversing the orientation of one of the at least two rows of opening devices;

closing said opening devices by folding each of the opening devices along the connecting means;

positioning said at least two rows of said opening devices adjacent one another;

joining said at least two rows of said opening devices by welding to form a sheet of opening devices; and placing said sheet of opening devices in a holding device.

9. The method of claim 8, wherein said extruding step includes extruding opening devices wherein two outermost opening devices at each end of said at least one row of opening devices are provided with projections.

10. The method of claim 9, wherein the joining step includes joining the projections in one row to the opening devices in a neighboring row by welding.

* * * * *